United States Patent [19]
Collins

[11] Patent Number: 5,963,951
[45] Date of Patent: Oct. 5, 1999

[54] COMPUTERIZED ON-LINE DATING SERVICE FOR SEARCHING AND MATCHING PEOPLE

[75] Inventor: Gregg Collins, Los Angeles, Calif.

[73] Assignee: Movo Media, Inc., Los Angeles, Calif.

[21] Appl. No.: 08/885,199

[22] Filed: Jun. 30, 1997

[51] Int. Cl.⁶ .................................................. G06F 17/30
[52] U.S. Cl. ............................................. 707/102; 707/3
[58] Field of Search ........................... 455/2, 4.2; 707/1, 707/2, 3, 4, 5, 100, 102; 364/282.1, 974; 379/201

[56] References Cited

U.S. PATENT DOCUMENTS

| | | |
|---|---|---|
| Re. 30,579 | 4/1981 | Goldman et al. . |
| Re. 30,580 | 4/1981 | Goldman et al. . |
| 4,307,266 | 12/1981 | Messina . |
| 4,348,744 | 9/1982 | White ................................ 395/200.83 |
| 4,427,848 | 1/1984 | Tsakanikas . |
| 4,649,563 | 3/1987 | Riskin . |
| 4,650,927 | 3/1987 | James . |
| 4,677,659 | 6/1987 | Dargan . |
| 4,737,980 | 4/1988 | Curtin et al. . |
| 4,817,129 | 3/1989 | Riskin . |
| 4,845,739 | 7/1989 | Katz . |
| 4,866,759 | 9/1989 | Riskin . |
| 4,918,721 | 4/1990 | Hashimoto . |
| 4,930,150 | 5/1990 | Katz . |
| 4,932,046 | 6/1990 | Katz et al. . |
| 4,939,773 | 7/1990 | Katz . |
| 4,975,945 | 12/1990 | Carbullido . |
| 4,987,590 | 1/1991 | Katz . |
| 5,014,298 | 5/1991 | Katz . |
| 5,016,270 | 5/1991 | Katz . |
| 5,031,206 | 7/1991 | Riskin . |
| 5,048,075 | 9/1991 | Katz . |
| 5,091,933 | 2/1992 | Katz . |
| 5,109,404 | 4/1992 | Katz et al. . |
| 5,218,631 | 6/1993 | Katz . |
| 5,224,153 | 6/1993 | Katz . |
| 5,255,309 | 10/1993 | Katz . |
| 5,259,023 | 11/1993 | Katz . |
| 5,297,197 | 3/1994 | Katz . |
| 5,337,347 | 8/1994 | Halstead-Nussloch et al. . |
| 5,339,358 | 8/1994 | Danish et al. . |
| 5,347,306 | 9/1994 | Nitta ...................................... 345/332 |
| 5,351,285 | 9/1994 | Katz . |
| 5,359,645 | 10/1994 | Katz . |
| 5,365,575 | 11/1994 | Katz . |
| 5,392,338 | 2/1995 | Danish et al. . |
| 5,442,688 | 8/1995 | Katz . |
| 5,495,284 | 2/1996 | Katz . |
| 5,548,634 | 8/1996 | Gahang et al. . |
| 5,553,120 | 9/1996 | Katz . |
| 5,561,707 | 10/1996 | Katz . |
| 5,764,736 | 6/1998 | Shachar et al. ....................... 379/93.09 |
| 5,775,695 | 7/1998 | Byers ..................................... 273/161 |
| 5,796,395 | 8/1998 | De Hond .............................. 345/331 |
| 5,802,156 | 9/1998 | Felger ................................... 379/112 |
| 5,894,556 | 4/1999 | Grimm et al. ........................... 463/42 |

OTHER PUBLICATIONS

Match.Com, Version 3.0, Electric Classified, PR Newswire San Francisco, Oct. 30, 1995.

*Primary Examiner*—Paul R. Lintz
*Assistant Examiner*—Ella Colbert
*Attorney, Agent, or Firm*—Stephen C. Glazier

[57] ABSTRACT

In an on-line dating service, a database of subscriber information is searched to find at least one subscriber matching user search criteria. The subscriber information includes preferences of subscribers to the service. Personal preferences for a user are obtained as search criteria. The personal preferences and the subscriber information include at least: a gender preference; a geographic location preference; an age preference; appearance preferences; religious belief preferences; educational level preferences; and a goal preference, and the goal preference is one of "romance"; "friendship" or "a walk on the wild side", the geographic location preference is at least one of a postal code, a country, a city, a suburb, a block, or a street The subscriber information includes a date of last payment of a use fee by each subscriber and a date of last updating of a personal profile by each subscriber. The database is repeatedly searched for records matching the personal preferences of the user by at least a percentage match parameter value. The percentage match parameter is reduced by a value of say 10%, until at least a required number of matching records are found.

49 Claims, 7 Drawing Sheets

Items marked with * match your request. A "Don't Care" in your request matches everything.

Matches 1 Through 10:

Margaret from West Hollywood
Zip!-ability quotient: 54
Age: 30*
Race: Caucasian*
Hair color: Black
Eye color: Green
Height: Taller Than Average
Build: Average*
Looking for: A walk on the wild side
Location: West Hollywood, CA 90069
Last Called: Thu, June 5

To contact Margaret, call Zip! and leave a message for her in her personal mailbox. First time callers can use GuestPass xxx to Zip! on in!
Zip! phone number: (310) 657-9184
Margaret's Zip! box number: 78

FIG.7

COMPUTERIZED ON-LINE DATING SERVICE FOR SEARCHING AND MATCHING PEOPLE

RELATED APPLICATIONS

This invention is related to co-pending U.S. patent application Ser. No. 08/885,198, titled "Computer-Implemented Method, System and Interface Thereto for Matching People" to Gregg Collins, filed concurrently herewith and assigned to the same assignee as this application, the contents of which are hereby incorporated herein by reference.

BACKGROUND OF THE INVENTION

RESERVATION OF COPYRIGHT

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

This invention relates to an a computer-implemented dating service, and more particularly, to a method, system and apparatus for real-time, on-line computer searching and matching of database entries based on location and user-selectable search criteria.

BACKGROUND

Matchmaking is an age-old art, made increasingly necessary nowadays by the demographic and cultural changes which make it difficult for like-minded people to meet. The social and family structures which help people meet each other are no longer available or acceptable to a large portion of society. Accordingly, it is desirable to have some sort of system which helps people meet each other.

There are systems which take some advantage of telephone technology to aid in this process. In these systems, a person wishing to meet another person must make a telephone call to a number and is then able to hear messages from others who are looking to meet people. In most of these prior systems, the user is able to select a category of people based only on gender preference. That is, a man looking to meet women makes one selection and listens to the appropriate messages, whereas a woman wanting to meet men would make a different selection to hear messages from men wanting to meet women. Of course selections can also be made for men wanting to meet other men, women wanting to meet woman and all sorts of other combinations.

However, in these prior art systems, once a person has made their gender preference selection, that person will have to listen to all appropriate messages. Most prior systems do provide the user with a way to skip or replay messages.

In most prior systems, each message comes from a particular person and has an identification, e.g., a box number, associated with it. Thus, in order for a user to contact the person who left a particular message, some systems provide users a way to reply to messages using the provided identification. For example, a system might say "This person is at box number 69, to leave a message for this person, press 69." Other systems do not indicate the box number to the user, and message replies are sent by pressing a particular key. For example, such a system might say "To leave a message for this person, press 1."

In general, prior art systems are little more than voice-mail systems with some additional control features added.

Proprietors of this type of system make money by either charging for subscription or by requiring parties to call the system using toll calls, e.g., from "900" numbers.

There are now some systems which allow users to get some information about them from the World Wide Web (the Web). Typically these systems use the Web for advertising, and they do little more than direct users to a telephone system. While such a use makes financial sense, it does not make good use of the power of the Web.

As noted above, in prior art systems, once a person has made their gender preference selection, that person will have to listen to all appropriate messages, with the only control being the ability to skip messages. Thus, when a user of one of these systems (Web-based or telephone-based) wants to find a match they have to listen to (or in some way peruse) all messages.

SUMMARY OF THE INVENTION

It is desirable to provide an on-line dating service that provides user-controlled perusal of search results. It is further desirable to provide an on-line dating service that always provides users with the ability to perform searches based on user-specified criteria, including location criteria. It is still further desirable to provide an on-line dating service that provides users with at least some search results, regardless of what search criteria they specify.

For example, in some situations, such as in the case of an on-line dating service such as described in co-pending U.S. patent application Ser. No. 08/885,198, titled "Computer-Implemented Method, System and Interface Thereto for Matching People", referenced and incorporated above, it is desirable to yield at least some kind of search results, whatever search criteria are specified for the search.

In order to produce a search result, regardless of the search criteria specified, this invention performs a series of searches through a search database, applying successively less restrictive search criteria until at least one positive result (match) is obtained. In this manner, a desired number of matching entries is almost always guaranteed, with the more desirable entries being reported first. Conventional database searching is not performed in such a manner.

Accordingly, in one aspect, this invention provides an apparatus, system and method for performing a database search of an on-line people-matching database that generates at least some matching entries, regardless of the search criteria specified.

This invention operates preferably in an on-line dating service. A database of subscriber information is searched to find at least one subscriber matching user search criteria. The subscriber information includes preferences of subscribers to the service. Users access the database by either a telephone or a computer. Personal preferences for a user are obtained as search criteria. Both the personal preferences and the subscriber information include at least: a gender preference; a geographic location preference; an age preference; appearance preferences; religious belief preferences; educational level preferences; and a goal preference, and wherein the goal preference is one of "romance"; "friendship" or "a walk on the wild side", wherein the geographic location preference is at least one of a postal code, a country, a city, a suburb, a block, or a street. The subscriber information includes a date of last payment of a use fee by each subscriber and a date of last updating of a personal profile by each subscriber. A percentage match parameter value is set to an initial value of say 70%; and then the database is repeatedly searched for records matching the personal preferences of the user by at least the percentage match parameter value. The percentage match parameter is reduced by a value of say 10%, until at least a required number of matching records are found. The required number of matching parameters is never less than one. The matching records are reported to the user along with the percentage match for each reported record and a degree of match of each of the search criteria. The matching entries are re-ordered according to: (a) a date of last payment of a use fee by each subscriber and/or (b) a date of last updating of a personal profile by each subscriber.

In most preferred embodiments, all of the user's search criteria can be successively relaxed except for the user's gender preference.

In one preferred embodiment the search of the database is made with the geographic location held fixed and other search criteria, except for gender preference, being successively relaxed. In another preferred embodiment the search of the database is made with the geographic location being successively widened before the other search criteria, except for gender preference, are relaxed.

This invention is a computer program, a method of performing the search, an apparatus for performing the search and a computer-readable media embodying the computer program to control a computer to effect the search.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DESCRIPTION OF THE PRESENTLY PREFERRED EXEMPLARY EMBODIMENTS

Figure 1:
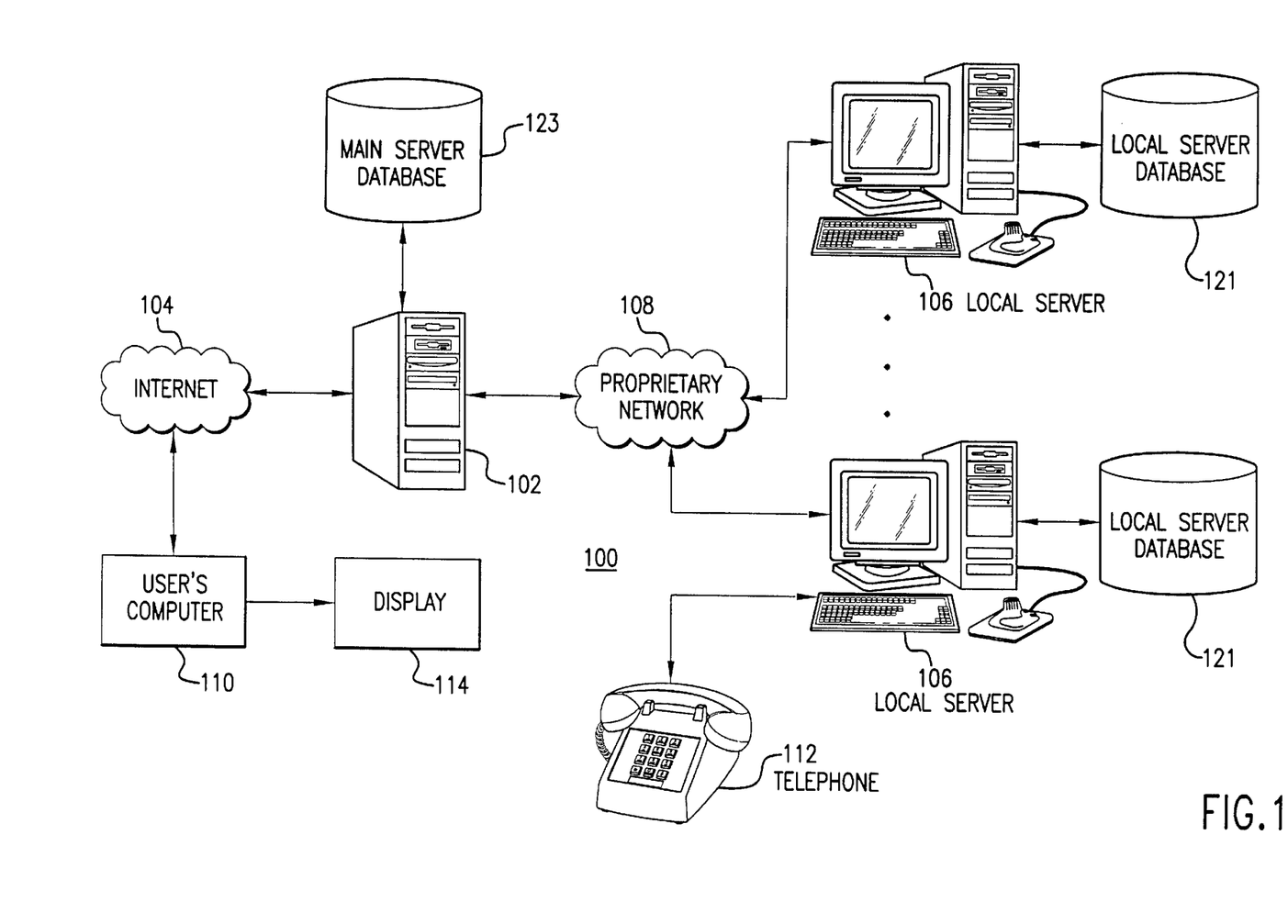
FIG. 1 shows an overview of the system of this invention.

The system 100 of this invention is now described with reference to FIG. 1, wherein a Web server 102 is connected to a network such as the Internet 104. At various locations, preferably geographically remote from that of the Web server 102, a number of local servers 106 connect to the Web server 102 via a proprietary network 108. A more detailed description of the operation of the system 100 is given in co-pending U.S. patent application Ser. No. to be assigned, titled "Computer-Implemented Method, System and Interface Thereto for Matching People", referenced and incorporated above.

In a preferred embodiment, the Web server 102 runs the Windows NT (trademark) operating system on a Pentium-based computer with an eight gigabyte hard disk and one hundred megabytes of random access memory (RAM).

The proprietary network 108 is a standard frame-relay network such as is operated by AT&T or MCI.

A user can access the system 100 either via the Internet 104 using a computer 110 (or some other form of accessing the Internet) or via a telephone 112, preferably a touch-tone phone, which accesses one of the local servers 106. A land-line, mobile, wireless, satellite telephone or the like may be used as user's telephone 112.

There are no special requirements for the user's computer 110, other than that it have some means of accessing the Internet 104.

Figure 2:
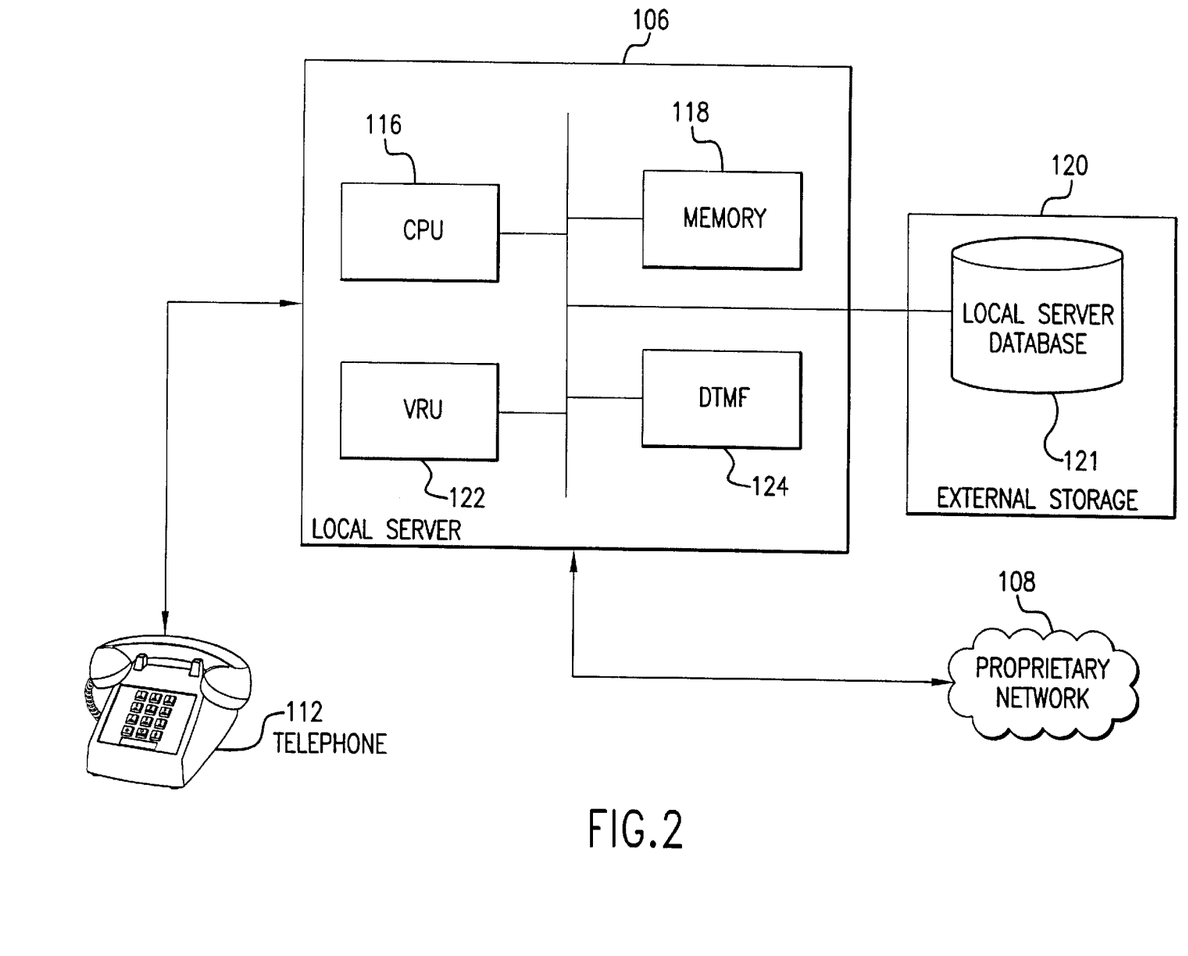
FIG. 2 provides a more detailed view of a local server of the system of FIG. 1.

A more detailed view of a typical local server 106 is shown in FIG. 2, wherein a local server 106 preferably includes a CPU 116, internal memory 118 and external storage 120. External storage 120 is preferably some storage device such as a hard disk drive or the like with a capacity, preferably of between 500 megabytes to 2 gigabytes. Each of the local servers 106 is also preferably a Windows NT-based computer system with that two megabytes of RAM as the internal memory 118. The local servers 106 are preferably at least as powerful as an Intel 386. That is, the CPU 116 is preferably at least an Intel 386.

A local server 106 preferably also includes a voice response unit (VRU) 122 for generating a voice response to a user's telephone 112. The VRU 122 directs an input from the server 106 to a user on a telephone 112. The user, communicating with the local server 106 through a telephone 112, enters input by depressing buttons on a telephone keypad. A DTMF receiver card 124 in the local server 106 receives DTMF tones from the telephone 112.

Each local server 106 includes a database 121, preferably Microsoft ACCESS (trademark), stored on external storage 120.

The Web server 102 also maintains a database 123 which is preferably a combination of all of the databases 121 of all of the local servers 106. That is, the database 123 at the Web server 102 preferably contains all the records of each of the databases 121 of each of the local servers 106. The Web server's database 123 must also track which of the local servers 106 any data comes from, thereby allowing searching at the Web server 102 based on the location of the local server 106.

Based on search requirements entered by a user (either via the telephone 112 or via a network such as the Internet 104) the local server 106 (or the Web server 102) performs one or more database searches, reporting matching entries to the user after each search. The server (local 106 or Web 102) may then successively change the search parameters and repeat the search with the new parameters until a desired number of matching entries is generated.

Figure 3:
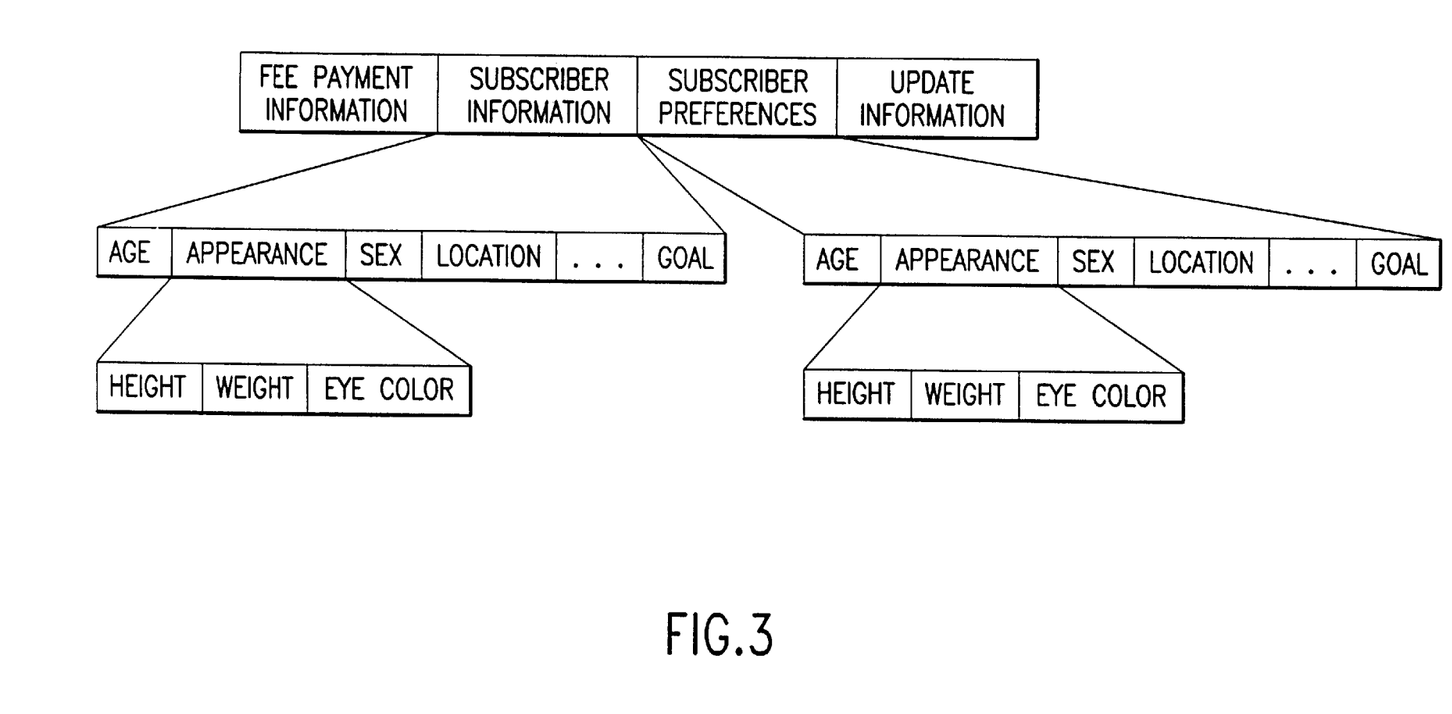
FIG. 3 shows a typical database record of the system of FIG. 1.

Each local server database 121 and the Web server database 123 contains information about subscribers to the system 100. In particular, each database contains subscriber information which can be located based on various search criteria such as, for example, geographic location, gender and gender preference, hair color, age, height, weight, body type and other appearance factors, race, religion, subscriber's goal, and the like. The subscriber's goal can be specified in terms of pre-determined options such as "romance", "friendship", a "walk on the wild side" and the like. Generally the database entries for each subscriber are established when the subscriber first subscribes to the system 100. However, in some embodiments a subscriber can change some of the attributes and criteria at any time. For example, a subscriber who tires of "friendship" may change her goal to "romance." Each database entry (for each subscriber) also contains an indication of when that entry was last updated and, optionally, when that subscriber made any payments to the system. A typical database record format is shown in FIG. 3, which shows the fields logically divided into subscriber information fields and subscriber preference fields as well as update time information and fee payment information. The structure shown in FIG. 3 is merely for the sake of description, and the actual database is organized based on the underlying database query program and the hardware and software running on the system.

The searching process for a server database (121 or 123) is described below with reference to FIG. 4.

Figure 4:
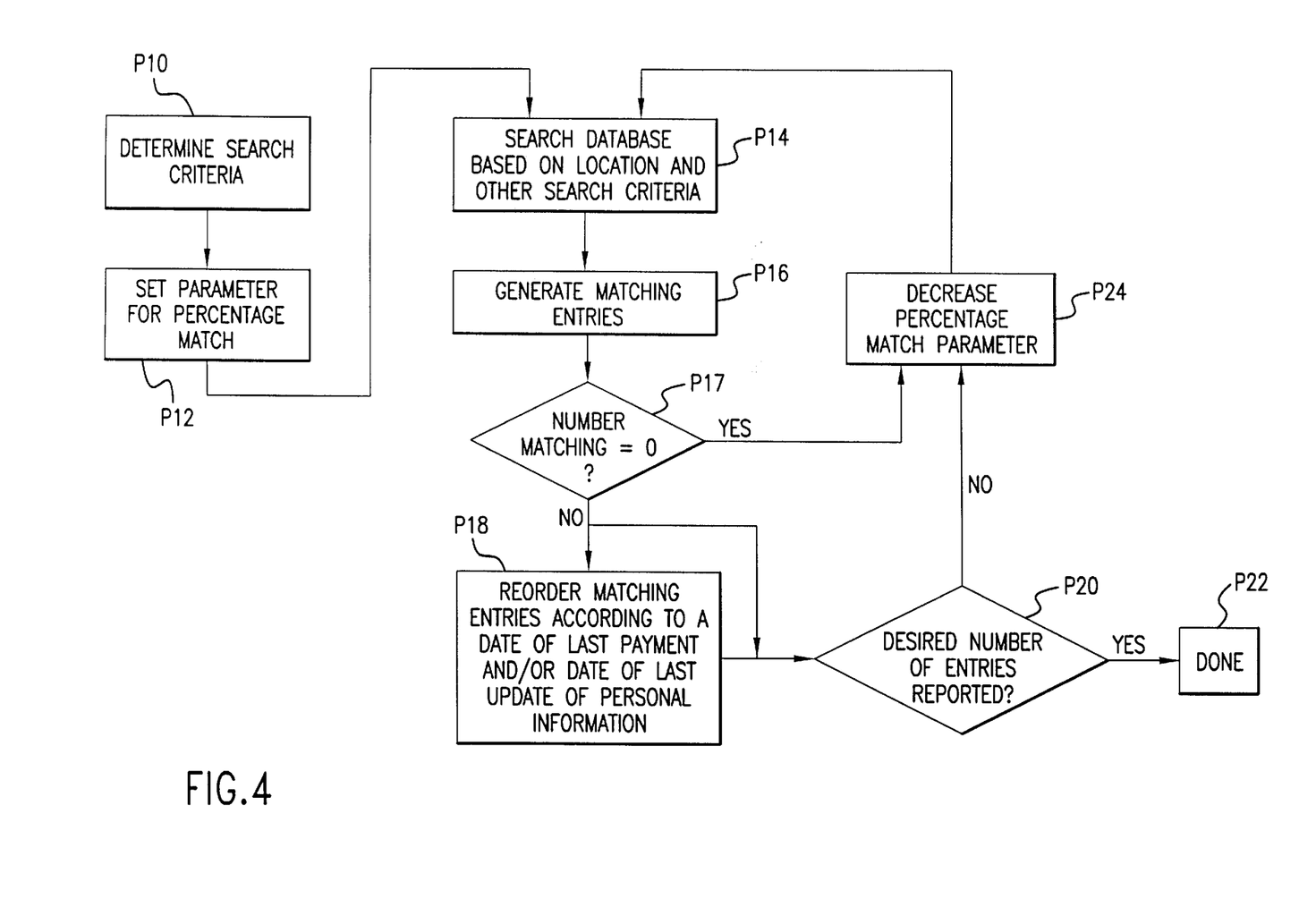
FIG. 4 illustrates searching a database according to the present invention.

As shown in FIG. 4, a user wishing to search a database must first provide search criteria (at P10). These criteria can include any combination of the subscriber information and preferences in the database. That is, a user can search for a subscriber based not only on that subscribers information, but also on that subscriber's preferences. Preferably the search criteria include a geographic location preference. In preferred embodiments of the system 100, the geographic location preference is given in terms of a postal zip code, although any other form of geographic location specifier can be used. For example, the location specifier may include one or more of zip code, county, city, state, precinct, block, street and country.

A user who is already a system subscriber can use her already entered subscriber information and preferences which are already stored in the database. A new user must at least enter search preferences and preferably at least some user information.

When the system 100 is being accessed by telephone 112, the user enters the location specifier as, for example, a zip code and the DTMF receiver card 124 receives the location specifier from the user. The system 100 also collects personal information from the user. In the case of telephone access to the system, this information is obtained, for example, by asking the user to press various keys on the telephone keypad to indicate answers to questions asked through the VRU 122. In the case of access via the network 104, the user's information is entered using any known manner using a typical browser application.

The personal information obtained can include, but is not limited to, the user's age, sex, the user's gender preference (including "couples"), the user's first name, race, hair color, build of body, and location including city and zip code. The system will also obtain from the user a goal which can be one of "romance," "friendship," "a walk on the wild side," and the like. The system 100 provides the user with a system phone number for a personal voice mail box; voice mail box number.

Figure 5:
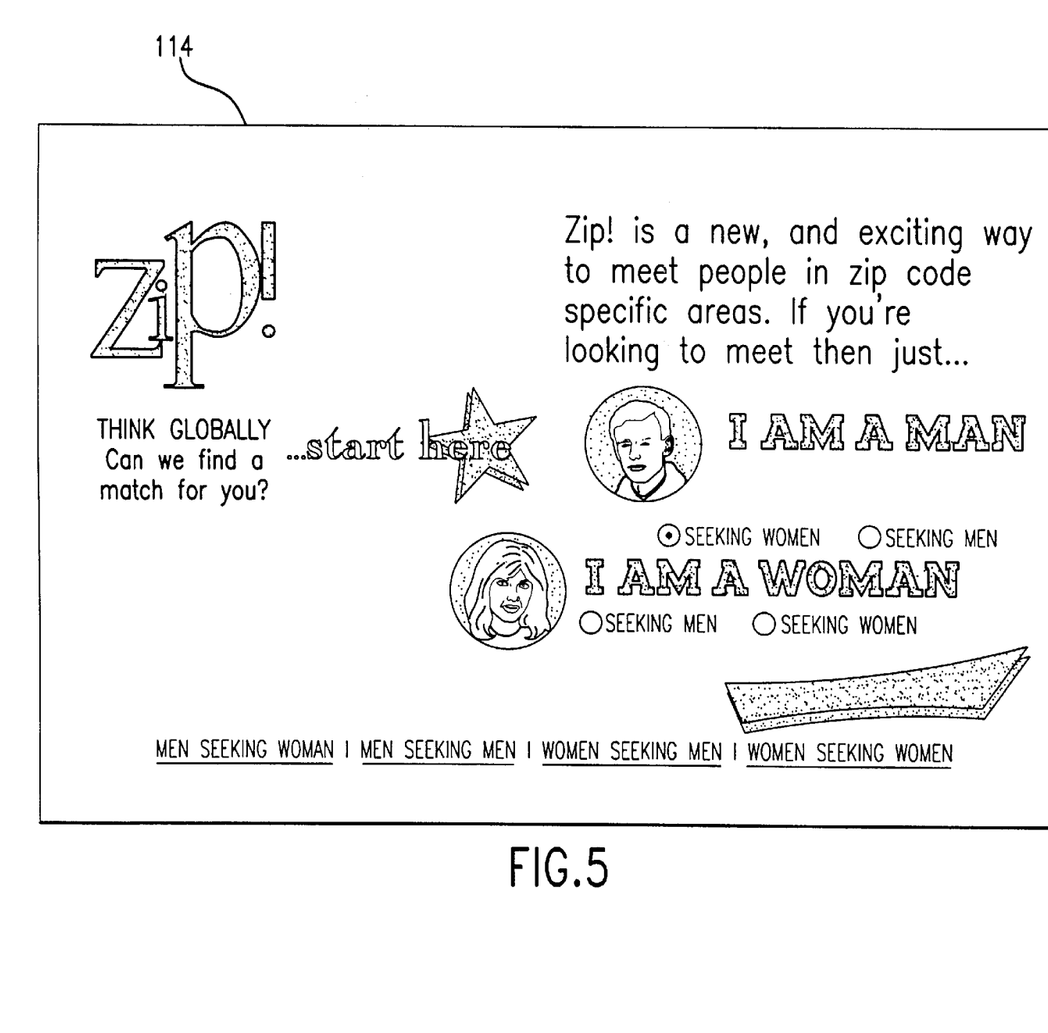
FIGS. 5–7 depict typical output displays of the search according to this invention.
Figure 6:
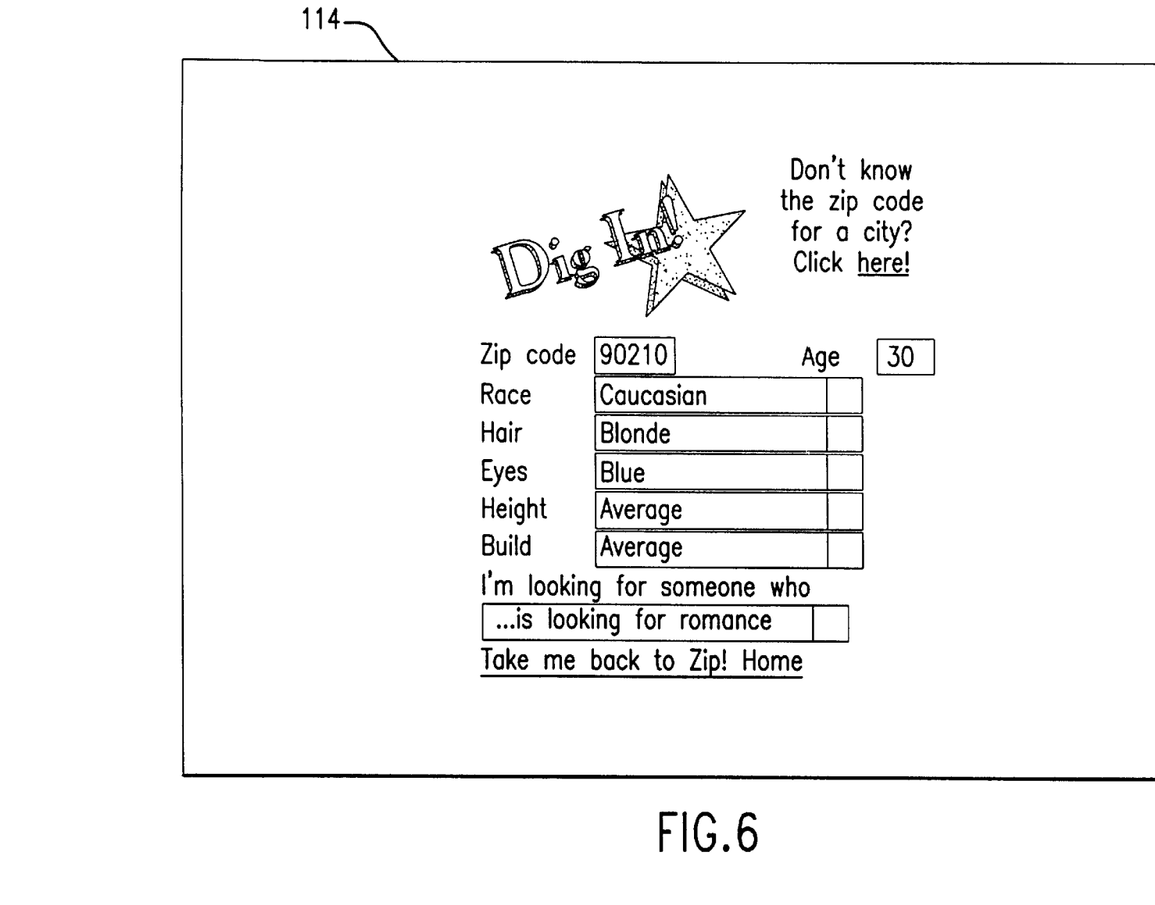

When the personal information is obtained over the telephone, the server 106 requests the personal information from the user by asking the user questions through the VRU 122. The questions include, for example, "Press 1 if you are a man", "Press 2 if you are a woman", "Press 1 if you are seeking a man", "Press 2 if you are seeking a woman", "Spell your first name using the buttons on your telephone keypad corresponding to the appropriate letters, press 7 for Q and 9 for Z", and the like. When the personal information is obtained via a user computer 110 over a network 104 such as the Internet, the user is presented with display screen forms such as those shown in FIGS. 5 and 6 and data is entered via the user's browser running on computer 110.

As noted above, it is preferable to find matches for people that are geographically suitable. It is also generally preferable to match people according to their gender preferences. Accordingly, in preferred embodiments, regardless of what other parameters are set, the gender preference and geographic location preference specifier must be set Once the search criteria have been obtained from the user, a location search parameter is set to be equal to the location specifier.

Next a percentage match parameter is set (at P12) to a value of, for example, seventy percent. This parameter is used to determine an acceptable degree of matching in the database. In some preferred embodiments users can indicate which, if any, of their search criteria can be varied and in what order. The percentage match parameter for each database search result is determined as a weighted function of the result. Generally the user cannot control this function or the weight parameter, although in some embodiments the user can give some search criteria higher weights than others. For example, someone might indicate that the system should vary race or religion, but never vary weight or height unless absolutely necessary.

Then the database (121 or 123) is searched (at P14) for entries matching the specified search criteria with a percentage match being at least equal to the specified percentage match parameter. The matching and near matching entries must have compatible personal information entries corresponding to the preferred gender and the preferred gender sought in the user's personal preference information. The following table illustrates the compatible gender preference entries.

| Personal Information in Database | | Compatible Information | Personal Preference |
| --- | --- | --- | --- |
| Gender | Gender Sought | Gender | Gender Sought |
| male | female | female | male |
| male | male | male | male |
| male | couple | couple | male |
| female | male | male | female |
| female | female | female | female |
| female | couple | couple | female |
| couple | couple | couple | couple |
| couple | male | male | couple |
| couple | female | female | couple |

Matching entries are generated as a result of searching the database (at P16).

If the search of the database finds no matching entries (at P17), then the percentage match parameter value is decreased (at P24) and the search is repeated (at P14) with the lower percentage match value.

The generated matches are optionally reordered (at P18) according to a date of last payment of a use fee, such as a fee paid in order to listen to messages in a user's voice mail box, and/or according to a date of last updating a user's personal profile, such as audio information containing information about the user recorded in a user's voice. Entries having more recent dates of payment of a fee and more recent dates of last updating are reported before other entries as a reward to those users who have recently paid the use fee or who have recently updated their personal profile. In this way the most recent users of the system will tend to get the most matches in the system.

Figure 7:
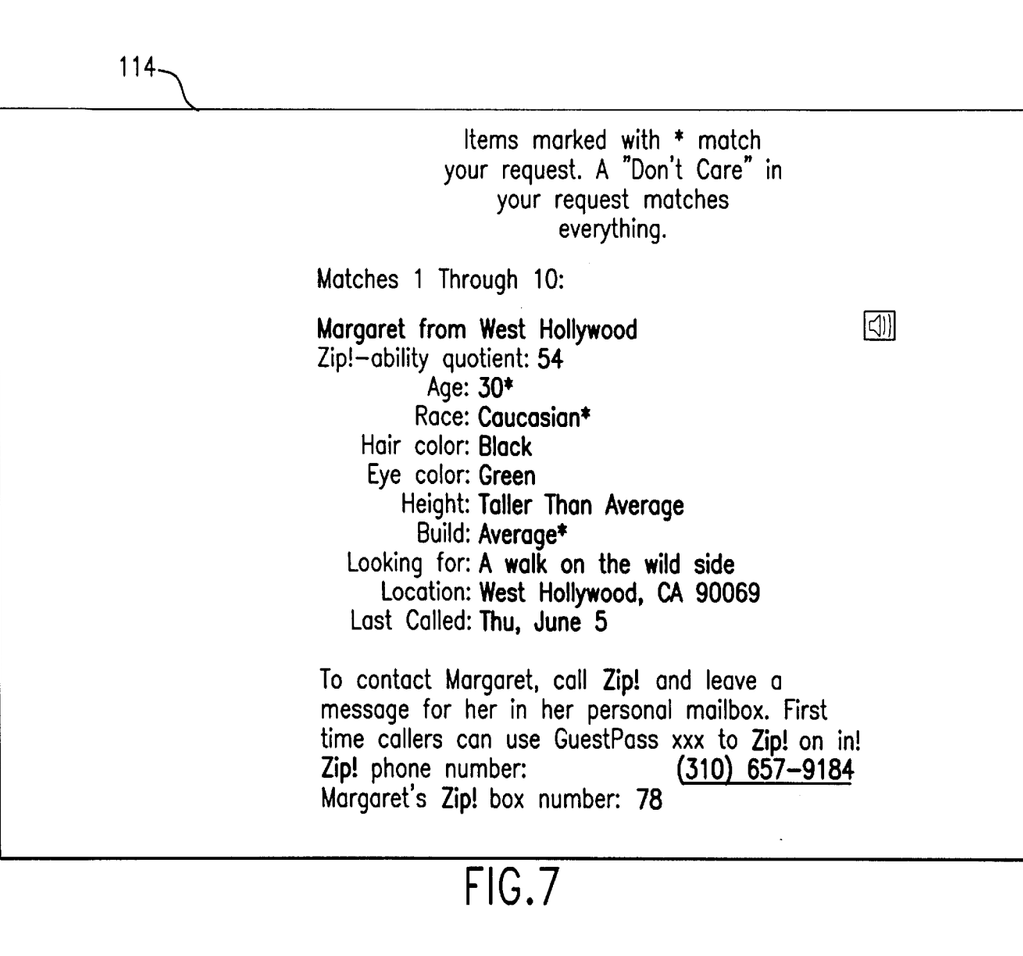

The reordered matching entries, if any exist, are then presented to the user. In the case of a user accessing the system by telephone 122, the results are announced to the user via the VRU 122, otherwise they are presented to the user on the display monitor 114 of his computer 110. An example of such a display output is shown in FIG. 7.

Next the system 100 determines whether the desired number of entries has been reported (at P20). This number is initially set by the system to be some value such as ten.

Preferably the user can change this number. It is never set to less than one. If it is determined that the desired number of entries has been reported then the search is done (at P22), and processing stops, otherwise the system 100 decreases the value of the percentage match parameter (at P24) and another search is performed (at P14). The percentage match parameter is initially set to some value such as seventy and then decreased in subsequent searches by ten each time until it reaches zero.

As noted above, generally the user cannot control this percentage parameter, although in some embodiments the user can give some search criteria higher weights than others. In preferred embodiments the location specifier is given the highest weight (after the gender preference) and is changed the least, so that matches in the user's geographic area will be found first.

Note that the notion of controlling a search by a percentage match is effectively the same as relaxing some or all of the search criteria until a match is found.

In most preferred embodiments, all of the user's search criteria can be successively relaxed except for the user's gender preference which must always be respected.

In some preferred embodiment the search of the database is made with the geographic location held fixed and other search criteria, except for gender preference, being successively relaxed. In those embodiments, the geographic location may eventually have to be changed, i.e., widened, if no search results are found in the required location, but it is only changed as a last resort.

In other preferred embodiments the search of the database is made with the geographic location being successively widened before or simultaneously with the other search criteria, except for gender preference, are relaxed.

In some preferred embodiments users can be given the option of which search criteria are to be relaxed and which are to be kept fixed.

In other preferred embodiments, a user may request matches regardless of location, in which case the location specifier is given a variable weight which is adjusted along with those of other criteria (at P24). If the geographic location is adjusted, it is preferably done so in five or ten mile increments.

In some embodiments, the system reports the match percentage for each search result, indicating the percentage of corresponding personal information in a database entry which matches the user's personal preference information. In a telephone-based user this information is announced to the user via the VRU 122.

The matching percentage can be announced to the user for the overall match or on a per criterion basis.

When this system is accessed by a user from her computer 110 (FIG. 1), the server 102 sends requests for information through the computer network 104 to the user's computer 110. The user enters information on her computer 110 which then sends the appropriate information through the network 104 to the server 102. Preferably the network 104 is the Internet and the user's computer 110 runs some kind of Internet browser software, such as Netscape (Trademark) or the Microsoft Internet Explorer (Trademark). The server 102 communicates with the browser software on the user's computer 110 and causes various forms to be displayed on the display 114 of the computer 110. The user fills in the forms as appropriate with the required information, such as, e.g., location specifier and personal information, and the information is sent through the network 104 to the server 102. Database search results are reported to the user computer 110 after each search. The browser software in the computer 110 displays the results to the user on the display 114, for example as shown in FIG. 7.

Preferably matching search fields are listed on the display 114 with an asterisk next to the matching field. A matching percentage is also reported to the user computer 110 to be displayed to the user.

EXAMPLE

An example of the weighting factors for a particular embodiment of the search algorithm is now presented. In this example the user's gender preference is never varied or relaxed and the user's geographic location is given the highest weight of all search criteria. The following table summarizes the weight factors for various criteria. Note that the criteria may be weighted differently, depending on gender preferences.

| Criterion | Weight |
| --- | --- |
| postal code (zip code) | 50 |
| age | 35 |
| race | 40 |
| hair color | 10 |
| eye color | 10 |
| height | 25 |
| goal | 30 |
| build | 25 |

In the embodiment of this example, the search takes place as follows:

First the system locates, from the database (121 or 123), all valid subscribers whose gender preference matches the required gender preference and who are located "nearby" the given postal (zip) code. Preferably a zip code is considered nearby if its centroid is within a system-configurable distance from the input zip code. For example, for Los Angeles, since zip codes areas are small and dense, nearby is set to fifty miles, whereas for Kansas where the zip code areas are large and sparse, nearby is set to one hundred and fifty miles.

Then, for each subscriber found in the first part (above), the system also retrieves the user's system information such as user name, phone number and a so-called band value for the zip code the user is in. For a given zip code the system currently defines four bands. Only the input (initial) zip code falls into band zero (0). All zip codes with centroids less than X miles of the input zip code's centroid fall into band 1. All zip codes with centroids greater than or equal to X miles of the input zip code's centroid, but less than Y miles from the centroid fall into band 2. Similarly, band 3 is defined for zip codes with centroids between Y and Z miles from the centroid of the input zip code. Finally, band 4 is all zip codes with centroids outside of Z miles from the input zip code. In other words, the bands define concentric circles around the centroid of the input zip code. The values of X, Y and Z, defining the radii of the concentric circles are defined at the time the system is setup and vary depending on the specific location and its population density. Zip codes within band 1, i.e., within Z miles of the centroid of the input zip code are considered nearby.

The presently preferred embodiment uses a proprietary zip code database called Pro-Zipcode! Trademark) from Professional Computer Consulting, Inc. This database is merely a list of comma separated values of zip code, state, city, county, latitude and longitude for all zip codes in the United States. The data from this database is stored in a Microsoft SQL database which is optimized for use with the system. In particular, invalid zip codes such as APOs and FPOs are removed, as are an zip codes with invalid longitude or latitude values. Next, a separate table is created which determines, for any zip code, what other zip codes are in that zip codes various bands (0 to 3).

Next, for each subscriber retrieved (who matched the gender and geographic location criteria), the system determines a score based on the subscriber's input information, the subscriber's preferences and the user's input and preferences. In the embodiment of this example, the score is determined as follows: if a criterion matches a preference then the score is increased by the weight associated with that criterion. So, e.g., if the user's hair color criterion matches the subscriber's hair color then the score is increased by the weight for that criterion, in this case ten. The same test is applied to the user's information and the subscriber's criterion.

When all categories have been compared, the resulting score is divided by the total possible score to determine a percentage match. Note that the total possible score may depend on some of the user's criteria.

The list of matching subscribers is then sorted in descending order by score, then in ascending order by zip code and then in descending order of last access and/or payment.

At this time, if the access was via a user computer 110 and the Web server 102, the system on the Web server 102 locates the audio file and any other files for each user and makes them available as part of the list to the user.

The search described above is performed in multiple passes over the database. Each pass sequentially searches all users for matches. The number of passes is controlled by various database values. The current settings are for three major passes and three minor passes.

Each major pass decreases the matching score requirements. Each minor pass increases the zip code search radius. These values are retrieved from a database and can be changed at any time. The current preferred values are eighty percent, fifty percent and zero percent for major pass matching scores. The current preferred values for the minor pass zip code boundaries are zero, five and 10 mile radii.

The final pass removes the zip code radius restriction and sets the matching score to zero percent, effectively matching anyone of the specified sex and gender orientation.

Although described with reference to a particular system and implementation, the computer aspects of the present invention can be implemented in software, hardware or any combination thereof. When implemented fully or partially in software, the invention can reside, permanently or temporarily, on any machine readable memory or storage medium, including but not limited to a RAM, a ROM, a disk, an ASIC, a PROM and the like. In addition, the invention may be implemented using circuits, without the use of software. The software may be executed by a PC, a larger computer, an ASIC, a programmable machine, a computer network, or otherwise.

The embodiments illustrated and discussed herein are intended only to teach those skilled in the art the best way known by the inventor to make and use the invention. Nothing in the specification should be considered as limiting the scope of the present invention. Changes could be made by those skilled in the art to produce equivalent devices without departing from the invention. The present invention should only be limited by the following claims and their legal equivalents.

What is claimed:

1. In an on-line dating service, a method of searching a database of subscriber information in order to find at least one subscriber matching user search criteria, the subscriber information including preferences of subscribers to the service, wherein the users access the database by at least one of a telephone and a computer, wherein the subscriber information includes a date of last payment of a use fee by each subscriber and a date of last updating of a personal profile by each subscriber, the method comprising, by computer:

(A) repeatedly
    (a) searching the database for records matching search criteria of a user, and
    (b) relaxing at least some of the search criteria, until at least a required number of matching records are found, wherein the required number of matching records is never less than one;
  (B) reporting the matching records to the user, including
    (a) re porting a degree of match for each reported record; and
    (b) indicating, for each reported record, a degree of match of each of the search criteria,
  (C) reordering the matching entries according to at least one of:
    (a) a date of last payment of a use fee by each subscriber and
    (b) a date of last updating of a personal profile by each subscriber,
  wherein when the entries are reordered according to the date of last payment, the matching entries having a more recent date of the last payment are reported before others of the matching entries; and
  when the entries are reordered according to the date of last updating, the matching entries having a more recent data of last updating are reported before others of the matching entries, and
  wherein the search criteria include at least one of: a gender preference; a geographic location preference; an age preference; appearance preferences; religious belief preferences; educational level preferences; and a goal preference; and
  wherein the goal preference is one of "romance"; "friendship" or "a walk on the wild side"; and
  wherein the geographic location preference is at least one of: a postal code, a country, a city, a suburb, a block, or a street; and
  wherein the gender preference search criterion is never relaxed, and
  wherein the geographic location preference search criterion is only relaxed after other search criteria have been relaxed.

2. In an on-line dating service, a method of searching a database of subscriber information in order to find at least one subscriber matching user search criteria, the subscriber information including preferences of subscribers to the service, the method comprising, by computer:
  repeatedly
    (a) searching the database for records matching search criteria of a user, and
    (b) relaxing at least some of the search criteria, until at least a required number of matching records are found.

3. A method as in claim 2 further comprising:
  reporting the matching records to the user.

4. A method as in claim 3 wherein the reporting of the matching records includes reporting a degree of match for each reported record.

5. A method as in claim 3 wherein the reporting of the matching records includes indicating, for each reported record, a degree of match of each of the search criteria.

6. A method as in claim 3 wherein the subscriber information includes a date of last payment of a use fee by each subscriber and a date of last updating of a personal profile by each subscriber, the method further comprising:
   reordering the matching entries according to at least one of:
   (a) a date of last payment of a use fee by each subscriber and
   (b) a date of last updating of a personal profile by each subscriber.

7. A method as in claim 6 wherein,
   when the entries are reordered according to the date of last payment, the matching entries having a more recent date of the last payment are reported before others of the matching entries; and
   when the entries are reordered according to the date of last updating, the matching entries having a more recent data of last updating are reported before others of the matching entries.

8. A method as in claim 2 wherein the users access the database by at least one of a telephone and a computer.

9. A method as in claim 2 wherein the required number of matching records is never less than one.

10. A method as in claim 2 wherein both the search criteria include at least one of: a gender preference; a geographic location preference; an age preference; appearance preferences; religious belief preferences; educational level preferences; and a goal preference.

11. A method as in claim 10 wherein the goal preference is one of "romance"; "friendship" or "a walk on the wild side."

12. A method as in claim 11 wherein the geographic location preference is at least one of: a postal code, a country, a city, a suburb, a block, or a street.

13. A method as in claim 2 wherein only some of the search criteria are relaxed.

14. A method as in claim 13 wherein the gender preference search criterion is never relaxed.

15. A method as in claim 13 wherein the geographic location preference search criterion is only relaxed after other search criteria have been relaxed.

16. A method as in claim 13 wherein the geographic location preference criterion is relaxed before any other criteria are relaxed.

17. In an on-line dating service, an apparatus of searching a database of subscriber information in order to find at least one subscriber matching user search criteria, the subscriber information including preferences of subscribers to the service, wherein the users access the database by at least one of a telephone and a computer, wherein the subscriber information includes a date of last payment of a use fee by each subscriber and a date of last updating of a personal profile by each subscriber, the apparatus comprising:
   (A) means for repeatedly
   (a) searching the database for records matching search criteria of a user, and
   (b) relaxing at least some of the search criteria, until at least a required number of matching records are found, wherein the required number of matching records is never less than one;
   (B) means for reporting the matching records to the user, including
   (a) means for reporting a degree of match for each reported record; and
   (b) means for indicating, for each reported record, a degree of match of each of the search criteria,
   (C) means for reordering the matching entries according to at least one of:
   (a) a date of last payment of a use fee by each subscriber and
   (b) a date of last updating of a personal profile by each subscriber,
   wherein when the entries are reordered according to the date of last payment, the matching entries having a more recent date of the last payment are reported before others of the matching entries; and
   when the entries are reordered according to the date of last updating, the matching entries having a more recent data of last updating are reported before others of the matching entries, and
   wherein the search criteria include at least one of: a gender preference; a geographic location preference; an age preference; appearance preferences; religious belief preferences; educational level preferences; and a goal preference; and
   wherein the goal preference is one of "romance"; "friendship" or "a walk on the wild side"; and
   wherein the geographic location preference is at least one of: a postal code, a country, a city, a suburb, a block, or a street; and
   wherein the gender preference search criterion is never relaxed, and
   wherein the geographic location preference search criterion is only relaxed after other search criteria have been relaxed.

18. In an on-line dating service, an apparatus of searching a database of subscriber information in order to find at least one subscriber matching user search criteria, the subscriber information including preferences of subscribers to the service, the apparatus comprising:
   means for repeatedly
   (a) searching the database for records matching search criteria of a user, and
   (b) relaxing at least some of the search criteria, until at least a required number of matching records are found.

19. An apparatus as in claim 18 further comprising:
   means for reporting the matching records to the user.

20. An apparatus as in claim 19 wherein the reporting means includes means for reporting a degree of match for each reported record.

21. An apparatus as in claim 19 wherein the reporting means includes means for indicating, for each reported record, a degree of match of each of the search criteria.

22. An apparatus as in claim 19 wherein the subscriber information includes a date of last payment of a use fee by each subscriber and a date of last updating of a personal profile by each subscriber, the apparatus further comprising:
   means for reordering the matching entries according to at least one of:
   (a) a date of last payment of a use fee by each subscriber and
   (b) a date of last updating of a personal profile by each subscriber.

23. An apparatus as in claim 22 wherein,
   when the entries are reordered according to the date of last payment, the matching entries having a more recent date of the last payment are reported before others of the matching entries; and when the entries are reordered according to the date of last updating, the matching entries having a more recent data of last updating are reported before others of the matching entries.

24. An apparatus as in claim 18 wherein the users access the database by at least one of a telephone and a computer.

25. An apparatus as in claim 18 wherein the required number of matching records is never less than one.

26. An apparatus as in claim 18 wherein the search criteria include at least one of: a gender preference; a geographic location preference; an age preference; appearance preferences; religious belief preferences; educational level preferences; and a goal preference.

27. An apparatus as in claim 26 wherein the goal preference is one of "romance"; "friendship" or "a walk on the wild side."

28. An apparatus as in claim 26 wherein the geographic location preference is at least one of: a postal code, a country, a city, a suburb, a block, or a street.

29. An apparatus as in claim 18 wherein only some of the search criteria are relaxed.

30. An apparatus as in claim 29 wherein the gender preference search criterion is never relaxed.

31. An apparatus as in claim 29 wherein the geographic location preference search criterion is only relaxed after other search criteria have been relaxed.

32. An apparatus as in claim 29 wherein the geographic location preference criterion is relaxed before any other criteria are relaxed.

33. Computer-readable media tangibly embodying a program of instructions executable by a computer to perform, in an on-line dating service, a method of searching a database of subscriber information in order to find at least one subscriber matching user search criteria, the subscriber information including preferences of subscribers to the service, wherein the users access the database by at least one of a telephone and a computer, wherein the subscriber information includes a date of last payment of a use fee by each subscriber and a date of last updating of a personal profile by each subscriber, the method comprising, by computer:

(A) repeatedly
 (a) searching the database for records matching search criteria of a user, and
 (b) relaxing at least some of the search criteria, until at least a required number of matching records are found, wherein the required number of matching records is never less than one;

(B) reporting the matching records to the user, including
 (a) reporting a degree of match for each reported record; and
 (b) indicating, for each reported record, a degree of match of each of the search criteria, (C) reordering the matching entries according to at least one of:
 (a) a date of last payment of a use fee by each subscriber and
 (b) a date of last updating of a personal profile by each subscriber, wherein when the entries are reordered according to the date of last payment, the matching entries having a more recent date of the last payment are reported before others of the matching entries; and when the entries are reordered according to the date of last updating, the matching entries having a more recent data of last updating are reported before others of the matching entries, and wherein the search criteria include at least one of: a gender preference; a geographic location preference; an age preference; appearance preferences; religious belief preferences; educational level preferences; and a goal preference; and wherein the goal preference is one of "romance"; "friendship" or "a walk on the wild side"; and wherein the geographic location preference is at least one of: a postal code, a country, a city, a suburb, a block, or a street; and wherein the gender preference search criterion is never relaxed, and wherein the geographic location preference search criterion is only relaxed after other search criteria have been relaxed.

34. Computer-readable media tangibly embodying a program of instructions executable by a computer to perform, in an on-line dating service, a method for searching a database of subscriber information in order to find at least one subscriber matching user search criteria, the subscriber information including preferences of subscribers to the service, the method comprising, by computer:

repeatedly
 (a) searching the database for records matching search criteria of a user, and
 (b) relaxing at least some of the search criteria, until at least a required number of matching records are found.

35. Computer-readable media as in claim 34 wherein the method further comprises:

reporting the matching records to the user.

36. Computer-readable media as in claim 35 wherein the reporting includes reporting a degree of match for each reported record.

37. Computer-readable media as in claim 35 wherein the reporting includes indicating, for each reported record, a degree of match of each of the search criteria.

38. Computer-readable media as in claim 34 wherein the users access the database by at least one of a telephone and a computer.

39. Computer-readable media as in claim 35 wherein the geographic location preference search criterion is only relaxed after other search criteria have been relaxed.

40. Computer-readable media as in claim 35 wherein the geographic location preference criterion is relaxed before any other criteria are relaxed.

41. Computer-readable media as in claim 34 wherein the required number of matching records is never less than one.

42. Computer-readable media as in claim 34 wherein the search criteria include at least one of: a gender preference; a geographic location preference; an age preference; appearance preferences; religious belief preferences; educational level preferences; and a goal preference.

43. Computer-readable media as in claim 42 wherein the goal preference is one of "romance"; "friendship" or "a walk on the wild side."

44. Computer-readable media as in claim 34 wherein only some of the search criteria are relaxed.

45. Computer-readable media as in claim 42 wherein the geographic location preference is at least one of: a postal code, a country, a city, a suburb, a block, or a street.

46. Computer-readable media as in claim 35 wherein the gender preference search criterion is never relaxed.

47. Computer-readable media as in claim 34 wherein the subscriber information includes a date of last payment of a use fee by each subscriber and a date of last updating of a personal profile by each subscriber, the method further comprising:

reordering the matching entries according to at least one of:
(a) a date of last payment of a use fee by each subscriber and
(b) a date of last updating of a personal profile by each subscriber.

48. Computer-readable media as in claim 47 wherein, when the entries are reordered according to the date of last payment, the matching entries having a more recent date of the last payment are reported before others of the matching entries; and when the entries are reordered according to the date of last updating, the matching entries having a more recent data of last updating are reported before others of the matching entries.

49. Computer-readable media as in any one of claims 33 to 42 wherein said media comprise at least one of a RAM, a ROM, a disk, an ASIC and a PROM.

* * * * *